United States Patent [19]

Cocco

[11] Patent Number: 4,797,761

[45] Date of Patent: Jan. 10, 1989

[54] TELESCOPING DISK DRIVE ASSEMBLY

[75] Inventor: Vincent L. Cocco, Wakefield, Mass.

[73] Assignee: Polaroid Corporation, Cambridge, Mass.

[21] Appl. No.: 874,003

[22] Filed: Jun. 13, 1986

[51] Int. Cl.⁴ .............................................. G11B 5/012
[52] U.S. Cl. ................................. 360/99.06; 360/133; 369/77.2; 369/270; 358/906
[58] Field of Search ............... 358/906, 909; 369/75.2, 369/77.1, 77.2, 261, 262, 270; 360/86, 97–99, 133, 96.5, 96.6, 85, 93, 95

[56] References Cited

U.S. PATENT DOCUMENTS

| | | | |
|---|---|---|---|
| 4,057,830 | 11/1977 | Adcock | 358/127 |
| 4,163,256 | 7/1979 | Adcock | 358/127 |
| 4,262,301 | 4/1981 | Erlichman | 358/6 |
| 4,366,501 | 12/1982 | Tsunekawa | 358/310 |
| 4,420,773 | 12/1983 | Toyoda et al. | 358/335 |
| 4,470,076 | 9/1984 | Arai et al. | 358/312 |
| 4,489,351 | 12/1984 | de Costemore d'Arc | 358/213 |
| 4,499,573 | 2/1985 | Morinaga | 369/270 |
| 4,553,175 | 11/1985 | Baumeister | 358/310 |
| 4,570,188 | 2/1986 | Ichiyanagi | 358/335 |
| 4,630,159 | 12/1986 | Saito | 360/133 |
| 4,656,542 | 4/1987 | Shibata | 360/97 |
| 4,686,665 | 8/1987 | Kamoshita | 369/77.2 |

FOREIGN PATENT DOCUMENTS

| | | | |
|---|---|---|---|
| 0137311 | 4/1985 | European Pat. Off. | 360/97 |
| 58-169301 | 10/1983 | Japan | 360/97 |
| 59-72880 | 4/1984 | Japan | 360/97 |
| 60-18854 | 1/1985 | Japan | 369/262 |
| 60-109058 | 6/1985 | Japan | 360/97 |
| 60-161956 | 8/1985 | Japan | 360/97 |

Primary Examiner—John H. Wolff
Attorney, Agent, or Firm—John S. Vale

[57] ABSTRACT

A compact apparatus is provided for writing and/or reading information on a disk. Compactness is achieved by mounting various disk drive components on first and second housing sections which are arranged in telescoping relation for movement between a compact operative position for write and/or read operations and an extended position wherein facing drive components are retracted or spaced further apart to facilitate disk insertion and withdrawal operations.

7 Claims, 3 Drawing Sheets

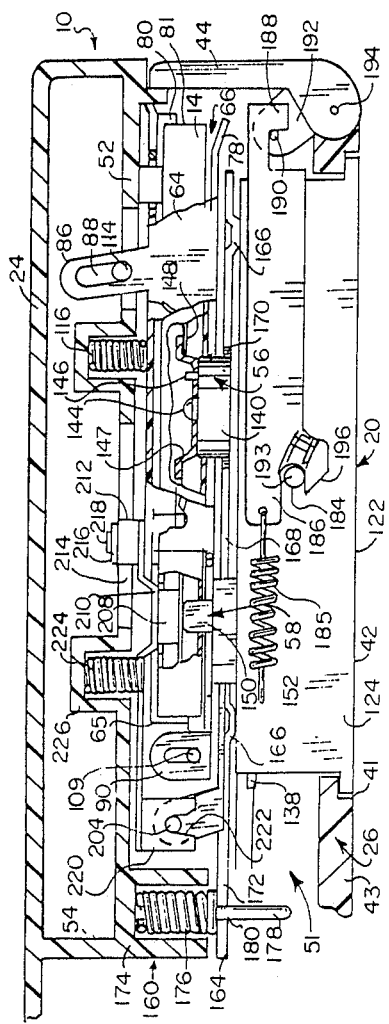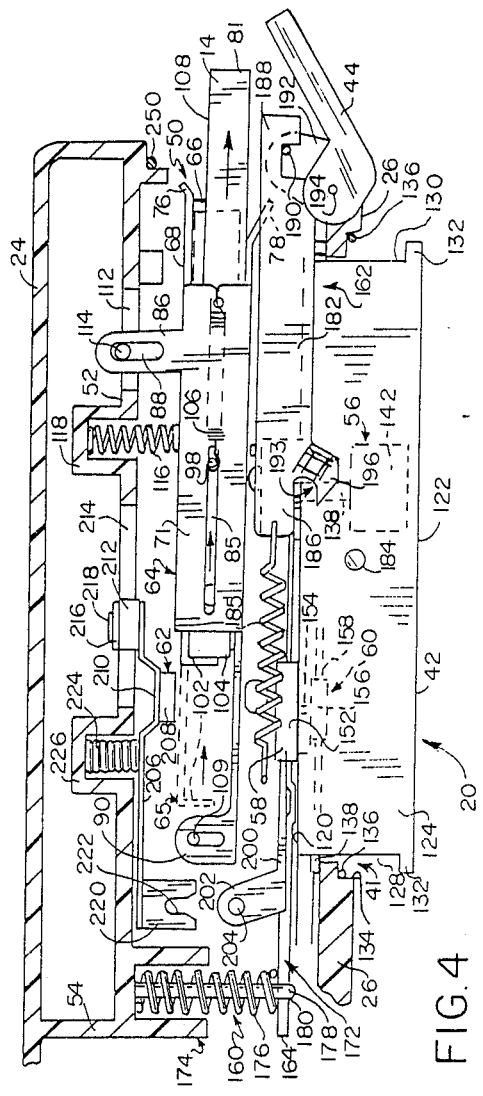
FIG.3
FIG.4

TELESCOPING DISK DRIVE ASSEMBLY

BACKGROUND OF THE INVENTION

The present invention relates to the field of recording apparatus and, more specifically, to a compact apparatus for writing and/or reading information on a disk; and which is especially well suited for use in small hand held or portable devices such as still image electronic cameras, audio disk players, small portable computers, and the like.

Recent improvements in magnetic, optical, and magneto-optical recording media; along with corresponding improvements in disk drives and players; have spurred interest in the development of small hand held and portable devices which write and/or read digital or analog information on a rotating disk. Not only does the disk format provide compact, inexpensive, and durable high density mass data storage, but it is ideally suited for random data access which significantly speeds up the data retrieval process.

Examples of these devices include commercially available audio disk players, CD-ROM drives and small portable computers. Also, there are a variety of proposed devices, such as a still image electronic camera which will be capable of recording from 25 to 50 color images on a 47 mm diameter flexible magnetic disk that is rotatably enclosed in a stiff plastic casing or cartridge.

In terms of consumer acceptability, it is highly desireable to make these devices as compact as possible thereby making it easy for a person to take the device along with them without it being a burden. Because such disk players and electronic cameras will be taken to beaches, ski resorts and other outdoor environments; and also because small computers will be used at construction sites, on oil rigs and in other industrial settings, it is very important that these devices be rugged in their construction as well as being highly resistant to dirt, sand and dust which will adversely effect the performance of the disk recording components. Also, it is most desireable that the task of inserting and withdrawing a disk should be as simple as possible to the point of being almost intuitive.

Major components of disk drives and optical disk players typically include a motor driven spindle, which engages the central hub of the disk for spinning it about its central axis, and a magnetic or optical transducer for reading and/or writing information on the disk.

In the case of a flexible magnetic disk, the transducer (magnetic read/write head) is generally configured to contact or fly in very close proximity (head spacing is in the micro-inch range) to the magnetic recording layer surface during read/write operations.

Optical heads generally also are designed to be operatively positioned very close to the data bearing layer of the disk during read/write operations. Typically, these drives or players are provided with structure in the form of a pressure pad, second head, or disk cassette locating surface on the back side of the disk opposite the transducer.

Thus, when the disk is located in its operative position, its center hub is engaged by a drive spindle and its data recording or bearing area, located radially outward from the hub, is adapted to be located between the transducer on one side and a complementary device or structure such as a second head, pressure pad or cassette locating surface on the opposite side. In the case of a flexible magnetic disk, the head and pressure pad (or second head) are adapted to extend into the disk cartridge through radially extending access slots to locate these devices in operative relation to the corresponding disk surfaces.

To provide clearance for disk cartridge insertion and withdrawal, the spindle and transducer structure generally must be retracted away from the disk cartridge, or the disk cartridge must be otherwise moved or maneuvered, to displace it from its operative position.

In one approach, the additional space needed for component movement or cartridge manuevering is provided within the confines of the apparatus housing. This necessarily increases the size or external volume of the apparatus which one desires to make as small as possible to enhance portablility.

Another approach is to move part of the drive structure, such as the pressure pad by mounting it on a hinged disk cartridge loading door which is opened to insert or withdraw a disk cartridge. While this design only temporarily increases the external volume of the apparatus for disk loading operations, a definite advantage, generally, when the door is opened it exposes the drive components and disk along with other small precise electromechanical components of the drive to environmental dust and dirt, a major disadvantage.

There are a number of still image electronic cameras known in the prior art which show diagramatic representations of a disk and disk drive within the camera housing, but do not teach or suggest how the drive is structured for disk insertion or removal and what, if any, measures have been taken to minimize the disk and drive's exposure to environmental dust and dirt. For representative examples of these cameras, reference may be had to U.S. Pat. Nos. 4,470,076 (FIG. 1); 4,553,175 (FIG. 1) and 4,570,188 (FIGS. 1A and 1B).

Other electronic imaging cameras disclosed in the prior art use the opening door approach for media loading wherein the recording media (disk, tape cartridge, or magnetic drum) is adapted to be inserted or withdrawn face (largest dimension) first which requires a large door opening thereby maximizing exposure to dirt and dust. For examples of such apparatus utilizing a media face first loading door construction, reference may be had to U.S. Pat. Nos. 4,057,830 and 4,163,256 (FIGS. 8 and 10) along with U.S. Pat. Nos. 4,262,301 (FIGS. 5-12) and 4,366,501 (FIGS. 15-17).

Most commercially available flexible disk drives used in micro-computers employ a disk loading scheme wherein the disk cartridge is inserted edge first through a narrow slot loading door arrangement which minimizes exposure to dust and dirt. Previously noted U.S. Pat. Nos. 4,057,830 and 4,163,256 show, in FIG. 9, a camera that has spools of recording tape that may or may not be edge loaded from the rear of the camera housing, the patents specifically address this issue. In any case, however, the edge loading scheme will generally require movement of the internal components such as the spindle and transducer, or disk support, to provide a necessary clearance for media insertion and withdrawal. Again, providing space within the housing for such movement increases the exterior volume of the apparatus.

U.S. Pat. Nos. 4,420,773 (FIG. 1) and 4,489,351 (FIGS. 1-3) disclose cameras which utilize edge loading image data storing devices in the form of solid state memory modules. Thus, these camera structures are not concerned with and do not address the problems associated with a rotating disk storage medium including the problem of moving the drive spindle and the head structure into and out of operative relation with the disk.

Therefore, it is an object of the present invention to provide a compact apparatus for writing and/or reading information on a disk.

Another object is to provide such a compact apparatus that is structured to protect the disk drive components and the recording disk against contamination from dust, dirt, and the like.

Yet another object is to provide such a compact apparatus that is easy to use, yet simple and economical in its construction.

Still another object is to provide such a compact apparatus that is suitable for use in devices such as an electronic still image camera, portable audio and video disk players, and small portable computers and wherein the apparatus is configured to allow easy insertion and withdrawal of a data disk or disk enclosing cartridge.

Another object is to provide an electronic still image camera that includes such a compact apparatus for writing and/or reading information on a disk.

Other objects of the invention will, in part, be obvious and will, in part, appear hereinafter.

SUMMARY OF THE INVENTION

The present invention provides a compact apparatus for writing and/or reading information on a disk. In the illustrated embodiment, the apparatus is incorporated into a hand held still image electronic camera and is configured to record or write image data on a flexible magnetic recording disk. However, the apparatus embodying the present invention may easily be adapted for use in devices that employ other types of disk media such as an optical recording disk.

Broadly speaking, the compact apparatus comprises a housing including first and second housing sections arranged in telescoping relation for movement between a compact operative position and an extended disk insertion and withdrawal position. The housing is formed with means for defining an access opening therein through which the disk is moved for insertion and withdrawal.

Additionally, the apparatus includes a disk drive within the housing for writing and/or reading information on the disk. The disk drive includes means for receiving a disk inserted thereinto through the access opening and for supporting the disk at an operative location. Also, the drive includes at least first and second disk drive components between which at least a portion of the operatively located disk is configured to be disposed.

The at least first and second components are mounted, respectively, on the first and second housing sections for movement therewith between the compact operative position wherein the first and second components are in operative relation to the disk portion for write and/or read operations, and the extended position wherein the first and second components are spaced further away from the disk portion, than when in the operative position, to facilitate movement of the disk therebetween during disk insertion and withdrawal operations.

The apparatus achieves compactness by employing the telescoping housing structure which only temporarily increases the exterior volume of the apparatus when the housing sections are extended for disk insertion and withdrawal.

Advantageously the apparatus utilizes the relative movement of the housing sections to space apart internal components, such as a drive spindle and head assembly on one side of the disk and a pressure pad or second head on the opposite side of the disk, to facilitate disk movement therebetween. Also, the structure allows the disk to be inserted edge first through a narrow access opening in the housing. As noted earlier, the narrow access opening serves to protect the disk and disk drive components against contamination by dust and dirt.

The apparatus may include seals around the telescoping housing sections to prevent entry of dirt and dust. Also, the access opening may be provided with a hinged door, the operation of which is preferably configured to release a latch that allows the telescoping housings to move automatically, under spring bias, from the compact to the extended position. In the illustrated embodiment, the means for receiving and supporting the disk includes a disk cartridge support frame having a spring biased ejector which automatically ejects the disk to a partially withdrawn position in response to opening the access door. This makes the task of withdrawing a disk relatively simple and intuitive.

In the illustrated embodiment, the apparatus is incorporated into an electronic imaging camera wherein the second housing section, which houses the disk drive spindle and motor along with a magnetic transducer and means for moving the transducer radially with respect to the disk, is adapted to "pop out" of the back wall of the camera as it moves from the operative to the extended position. This movement is triggered in response to the unlatching operation. After the disk is loaded, the user merely closes the access door and then manually pushes the extended housing section inwardly into the camera back to relocate it and releasably secure it at the compact operative position.

BRIEF DESCRIPTION OF THE DRAWINGS

For a fuller understanding of the nature and objects of the present invention, reference may be had to the following detailed description and the accompanying drawings wherein:

FIG. 3 is a top elevational view, partly in section, of the apparatus showing its housing sections in the compact operative position;

FIG. 4 is similar to FIG. 3 except that the housing sections are shown in the extended position.

DESCRIPTION OF THE PREFERRED EMBODIMENT

Figure 1:
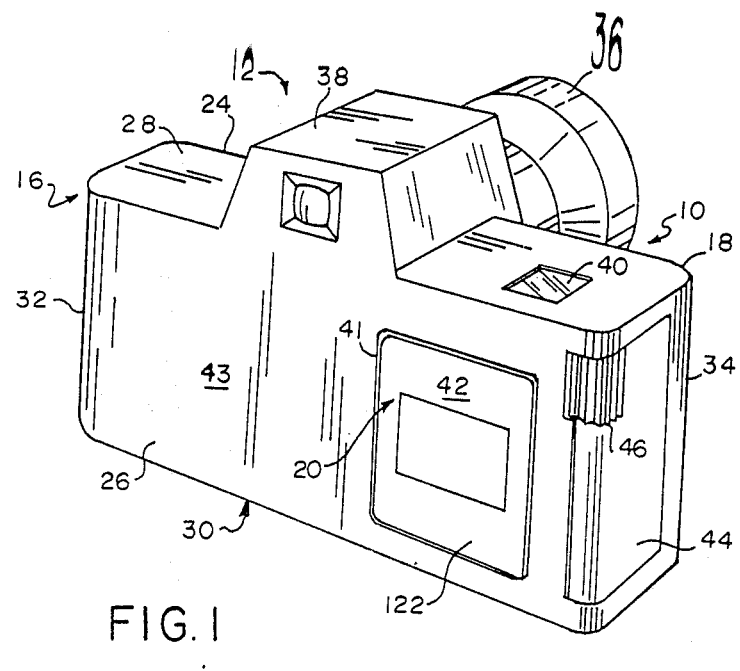
FIG. 1 is a perspective view of an electronic imaging still camera having incorporated therein a compact apparatus for writing and/or reading information on a disk, shown with its housing sections in the operative position.
Figure 2:
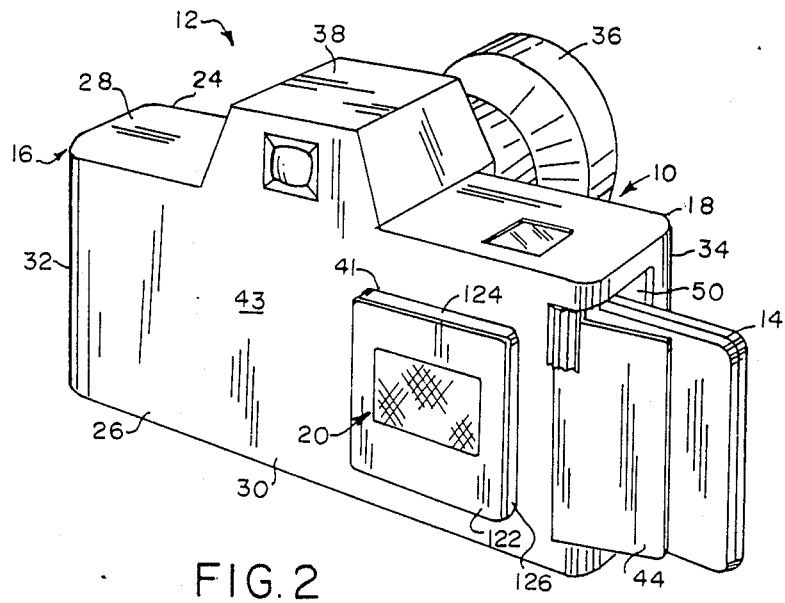
FIG. 2 is similar to FIG. 1 except that the housing sections are shown in their extended position and the disk access door is shown in its open position.

With reference to FIGS. 1 and 2, the present invention provides a compact apparatus 10 for writing and/or reading information on a disk. In the illustrated embodiment, apparatus 10 is shown incorporated into the right side of an electronic still image camera 12 for recording image data on a flexible magnetic disk enclosed in a disk cartridge or cassette 14.

While apparatus 10 will be shown and described as being part of camera 12, it should be understood that apparatus 10 also may be specifically configured for use in other devices. These other devices may include optical disk players and/or recorders, small computers, or CCD-ROM apparatus. Also, apparatus may be configured as a separate, self-contained, device that is adapated to serve as a peripheral mass data storage unit for devices that output and/or receive data signals.

Camera 12 includes a housing 16 comprising a first or major housing section 18 and a second housing section 20 arranged in telescoping relation for relative motion between a compact operative position shown in FIG. 1 and an extended disk insertion or withdrawal position shown in FIG. 2. As will become apparent later, housing section 20 mounts therein components of an internal disk drive that must be retracted or moved away from a disk at an operative location in the drive to facilitate disk insertion or withdrawal.

The major housing section 18 is defined by a forward wall 24, and oppositely disposed rear wall 26, a top wall 28, an oppositely disposed bottom wall 30, and a pair of oppositely spaced side walls 32 and 34.

The forward wall 24 has an objective lens assembly 36 mounted thereon for forming an image of a scene on an electronic image sensing device (not shown), such as a CCD or the like within housing section 18.

The top wall 28 has a viewfinder assembly 38 thereon, for viewing and framing a scene in the field of view of objective lens assembly 36, along with a window 40 of an exposure counter (not shown).

The rear wall 26 has a generally rectangular opening 41 on the right side thereof through which the second housing section 20 is adapted to travel between its compact operative position of FIG. 1, wherein its exterior surface 42 is substantially flush with the exterior surface 43 of rear wall 26, and the extended position of FIG. 2 wherein the rearwardmost portion of housing section 20 projects outwardly from the rear wall 26 of the camera 12 to move the drive components mounted thereon away from a flexible magnetic recording disk cartridge 14 in the drive.

Hinged to the right hand end of rear wall 26 is a disk loading door 44 which is adapted to be manually pivoted in response to exerting a torque force on a serrated thumb friction surface 46 at the upper end of the door 44 for moving the door 44 between its closed position, shown in FIG. 1 wherein it blocks a vertically disposed, narrow, disk access opening 50 in housing side wall 34; and the open position shown in FIG. 2 where it unblocks opening 50 to allow passage of the disk cartridge 14 therethrough during disk insertion or withdrawal operations.

FIGS. 3 and 4 respectively show top plan views of apparatus 10 i.e. the right side portion of camera 12) in its compact operative position and its extended position.

Compact apparatus 10 includes an internal disk drive 51 formed by various components, some of which are mounted on the first housing section 18, and others of which are mounted on the second housing section 20 so that these components may be moved relative to each other, and the operative location of the disk cartridge 14, in response to the telescoping movement of housing sections 18 and 20 between the compact and extended positions.

Located between the substantially parallel and laterally extending forward and rear walls 24 and 26 of housing section 18, is an internal fixed support member or plate 52 that extends laterally within housing section 18 between the interior surface of side wall 34, just forwardly of the axis slot 50, and an interior fixed support member or rib 54 which projects rearwardly from the interior of wall 24 in substantially perpendicular relation thereto.

In the illustrated embodiment, the movable housing section 20 mounts a motor driven spindle assembly 56; a magnetic transducer or recording head assembly 58; and a linear motor driven head positioning assembly 60 for moving the head assembly 58 radially with respect to disk 14. In this case, support member 52 mounts a pressure pad or second head assembly 62 which is adapted to be on the opposite side of the disk from the components mounted on housing section 20. However, it should be understood that the drive structure could be reversed. That is, the spindle, head, and head positioning components alternatively could be mounted on the major housing section 18, and the pressure pad or second head assembly 62 could be mounted on housing section 20.

Compact apparatus 10 can further includes means for receiving a disk inserted through access slot 50 and for supporting the disk at an operative location within drive 51 in the form of a disk receiving and supporting frame assembly 63. Assembly 63 comprises a support frame 64 having a slidable spring biased disk ejector 65 thereon. It is adapted to be located in the space between support 52 and housing section 20 and is configured to be moved between an operative position, shown in FIG. 3, where it is substantially parallel to support 52 in housing section 20 for supporting the disk 14 at its operative location for write and/or read operations; and an extended position, shown in FIG. 4, where it is displaced rearwardly further away from support 52 to align a disk insertion and withdrawal opening 66 at the right end of frame 64 with the disk access opening 50 and side wall 34 of housing section 18.

Figure 5:
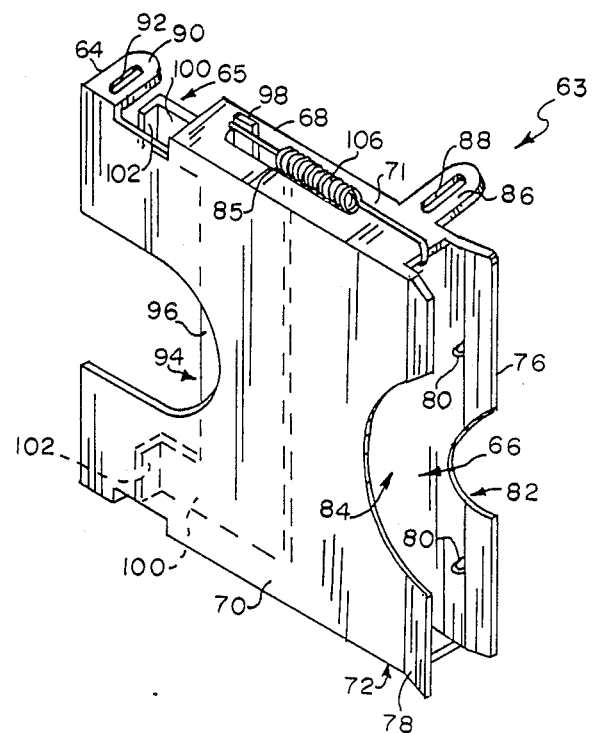
FIG. 5 is a perspective view of a disk cartridge or cassette receiving and supporting assembly which forms part of the compact apparatus embodying the present invention.

Frame 64, which is best shown in FIG. 5, is a hollow sheet metal or molded plastic component that has an interior chamber that conforms to the size and shape of the disk cartridge 14. It is formed by a short forward wall 68, and oppositely disposed longer rear wall 70, and a pair of oppositely disposed side walls 71 and 72 which connect the forward and rear walls 68 and 70.

The right or disk entry end portion of wall 68 is bent forwardly at 76 and cooperates with a rearwardly bent opposite portion 78 on rear wall 70, to provide a tapered or flared entry-way into opening 66 to facilitate disk insertion and removal. Extending rearwardly from the interior surface of wall 68 partially into opening 66 is a pair of disk cartridge retaining and locating flanges or stops 80 against which the trailing end 81 of disk cartridge 14 bears when the cartridge is located at its operative position in the frame 64. Also provided at this entry end of forward wall 68 is a semi-circular finger opening or cut-out 82 which provides access to the trailing end of cartridge 14, along with a similar but slightly larger cut-out 84 in rear wall 70, for manually grasping the cartridge and manipulating it during disk insertion and removal withdrawal operations.

The side walls 71 and 72 each include a longitudinally extending ejector guide slot 85 and an integrally formed mounting flange 86, having an elongated slot 88 therein, which projects forwardly beyond the forward wall 68.

The rear wall 70 includes, at its left end, a pair of inwardly turned and forwardly projecting mounted flanges 90 each of which has an elongated slot 92 therein. This end of rear wall 70 also has a large centrally cut-out or opening 94 therein which provides clearance for the spindle and head assembly to advance into the interior of frame 64 so as to operatively interface with a disk supported therein.

The ejector 65 takes the form of a thin metal plate 96 which is positioned within frame 64 adjacent the forward wall 68 and extends laterally between the side walls 71 and 72 for a sliding motion parallel to forward wall 68. The lateral ends of plate 96 has integrally formed and outwardly extending tabs 98 thereon which protrude through and are slidably received in the side wall ejector guide slots 85. Projecting outwardly from the left end of plate 96 is a pair of laterally spaced arms 100 each of which has an inwardly turned flange 102 that is adapted to be engaged by the leading end wall 104 of the disk cartridge 14.

The ejector 65 is normally spring biased to the right by a pair of helical springs 106 located on the exterior of side walls 71 and 72. Each spring 106 has one end grounded by a connection to the right end of the corresponding side wall and its opposite free end attached to a corresponding one of the tabs 98 on plate 96.

Thus, ejector 65 is mounted for reciprocating sliding movement within frame 64 and is spring biased to the right where it assumes its normal or minimum stress retracted position, shown in FIG. 4 where tabs 98 bear against the right end of the guide slots 85.

In operation, a disk cartridge 14 is inserted into opening 66, leading end wall 104 first, and is slidably advanced thereinto until the wall 104 engages the ejector flanges 102. As the cartridge 14 is further manually advanced into frame 64, it pushes the ejector 65 ahead of it thereby elongating the springs 106 and increasing the biasing force on the ejector 65.

When the trailing end wall 81 of the cartridge 14 clears the stops 80 on forward wall 68, the operator manually urges the trailing end of the cassette slightly forwardly until the forward wall 108 of the cartridge bears against the interior surface of the frame forward wall 68. Now, the stops 80 are in the outwardly directed path of travel of the cartridge trailing end wall 81 which is urged into bearing relation with the stops 80 by the biasing force applied by ejector 65. By this impressive force applied to the cartridge by ejector 65 and stops 80, the disk cartridge is frictionally held in frame 14 at its operative longitudinal location which is determined by the limiting stops 80.

To eject the cartridge 14, the operator merely presses the trailing end of the cartridge 14 rearwardly to disengage trailing end wall 81 from the pair of stops 80. Once the trailing end wall 81 is clear of the stops 80, the cartridge 14 will be advanced out of the frame through opening 66 by the biasing force applied thereto by ejector 65 as it moves back to its normal position of FIG. 4 under the influence of the biasing springs 106.

The disk cartridge receiving and supporting frame assembly 63 is mounted between housing support member 52 and rear housing wall 26 for movement between the operative disk write and/or read position of FIG. 3, wherein frame 64 is close and substantially parallel to member 52, and the disk insertion and withdrawal position of FIG. 4 wherein frame 64 is pushed back from member 52 and has pivotted slightly so that the right end of frame 64 is further away from member 52 than the left end to align the entry opening 66 with the axis opening 50 in housing side wall 34.

The left end of frame 64 is attached to housing 18 by means of veritcal pins 109 on the interior side of the top and bottom housing walls 28 and 30 that extend through the elongated slots 92 in the frame flanges 90. At the right end of frame 64, the flanges 86 extend through complementary openings 112 in member 52 and are coupled to the support by means of vertical pins 114 therein which extend through the longer elongated curve slots 88 in the flanges 86.

Assembly 63 is biased rearwardly toward its disk loading position of FIG. 4 by means of a helical compression spring 116 that is held at one end in a spring receiving socket 118 formed in member 52 and having its opposite free end in engagement with frame forward wall 68. As will become apparent later, frame 64 is pushed forwardly (against the force of spring 116) to its operative position of FIG. 3 and is held there in response to pushing in housing 20 and effecting its latching at its operative position of FIG. 3.

When housing section 20 is released, it moves rearwardly to its extended position and frame 64 is free to move rearwardly under the influence of spring 116. At first, it moves straight back towards wall 26 until the forward end of the shorter flange slots 92 engage the pins 109. At this point the forward ends of the longer slots 88 in flanges 86 have not yet engaged their corresponding pins 114. This means that the spring 116 applies a moment force on frame 64 causing it to pivot in a clockwise direction about pins 109 to angle the frame 64 with respect to member 52 and align the entry opening 66 with the axis slot 50. The frame pivoting motion is limited to a predetermined angle by the engagement of the forward ends of the slots 88 with their respective corresponding pins 114.

As best shown in FIGS. 3 and 4, housing section 20 is a hollow box-like structure defined by a forward wall 120; and oppositely disposed rear wall 122 having the previously noted exterior surface 42; a top wall 124; and oppositely disposed bottom wall 126 (see FIG. 2); a left side wall 128 and a right side wall 130.

The rear wall 122 is slightly larger than the forward wall 120 to form thereon an outwardly projecting peripheral flange 132 around the four sides of the back of housing section 20. When housing section 20 is in its compact operative position of FIGS. 1 and 3, the flange 132 is adapted to be received in a cooperating recessed seat 134 formed in rear wall 26 about the periphery of opening 41. When the flange 132 is received in seat 134 it serves as a stop which limits the forward penetration of housing section 20 into housing section 18. Preferably, the seat 134 has an O ring seal 136 therein which is compressed when housing section 20 is in its "pushed in" compact position for sealing this opening against the entry of dust, dirt and the like.

As best in FIG. 4, the side walls 128 and 130 each have an outwardly extending fixed stop member 138 thereon, adjacent forward wall 120, which extends outwardly beyond the sides of opening 41 and bear against the interior surface of rear wall 26 to limit the rearward movement of housing section 20 relative to housing section 18.

The spindle assembly 56 comprises a rotatable spindle shaft 138 which passes through a shaft bearing (not shown) in wall 120; a spindle head 140 fixed to the forward end of shaft 138 exteriorly of wall 120; and a direct drive electrical spindle motor 142 connected to the lower end of shaft 138 within the confines of housing section 20.

The spindle head 140 includes an axially aligned centering pin 144 and an off axis drive pin 146 which are adapted to extend through complementary openings in a hat shaped metal hub 147 of the flexible magnetic recording disk 148 in cartridge 14 when the spindle head 140 is advanced through the central hub axis opening in cartridge 14 to locate the spindle in rotational driving relation to the disk. The spindle drive motor 142 is electrically connected to a drive controller (not shown), which may be located within housing 20 or may be mounted within housing section 18.

The head assembly 58 comprises a magnetic write and/or read transducer 150 of conventional design that is mounted exteriorly of the forward wall 120 on a movable head mounting base 152. Projecting rearwardly from the bottom of base 152 is a connecting pin 154 (see FIG. 4), that projects rearwardly through a radially extending head guide slot in wall 120 and connects the head assembly 56 to a linear actuator or motor 156 of the head positioning system 60 that rides along a head guide track 158 that is disposed in parallel relation to the forward wall 120. The transducer 150 and linear motor 156 are connected to the previously noted drive controller which provides th appropriate motor drive signals and recording signals.

In response to energizing motor 156, it is driven along track 158 (in either direction depending on the direction of input current) to move the transducer 150 radially with respect to the disk 148. The drive may be configured to record on a continuous spiral track or a plurality of concentric circular tracks as is well known in the prior art.

For a more detailed description of the spindle assembly 56, the head assembly 58 and the head positioning assembly 60, reference may be had to commonly assigned co-pending application Ser. No. 858,009 filed on May 1, 1986 by V. L. Cocco.

Housing section 20, mounting selected components of the disk drive 51, is normally spring biased rearwardly to assume its extended disk insertion and removal position of FIGS. 2 and 4 by a plurality of spring and guide pin assemblies 160 (only one of which is shown for visual clarity) and is adapted to be releasably latched in the compact operative position of FIGS. 1 and 3 by a latch assembly 162 which is responsive to the opening and closing of loading door 44 for latching and unlatching housing section 20.

The spring assemblies 160 are adapted to engage a biasing plate 164 on housing section 20. Plate 164 is attached to forward wall 120 at dimpled pads 166 and has appropriate clearance openings 168 and 170 therein for spindle head 140 and transducer base 152 to project therethrough. At the left end of plate 164 is a portion 172 that extends out beyond the left side wall 128 of housing section 20 in facing relation to the illustrated spring assembly 160, and another portion (not shown) that extends downwardly beyond the bottom of forward wall 120 in facing relation to another spring assembly 160 (not shown) that applies a rearward biasing force to the right side of housing section 20.

The illustrated assembly 160 comprises a hollow, cylindrical, rearwardly facing spring retaining socket 174, formed on support member 52, holding therein one end of a helical biasing spring 176 that surrounds a centrally disposed and rearwardly extending guide pin 178. The free end of spring 176 engages and pushes against plate portion 172 and the free end of the guide pin 178 projects through an aligned guide hole 180 therein. The second spring assembly 160 (not shown) is of similar construction. Thus, the movement of housing section 20 between its operative and extended positions is guided by plate 164 riding along the guide pins 178. It should be noted that the pins 178 are of sufficient length so that they maintain their inserted position and holes 180 even when section 20 is in the fully retracted or extended position of FIG. 4.

The latching assembly 162 comprises a thin elongated latch bar 182, disposed between the top wall 124 of housing section 20 and the underside of the top wall 28 of housing section 18; a vertically disposed latch pin 184 projecting upwardly from the top wall 124 of housing section 20; and a biasing spring 185 having one end grounded to the underside of wall 28 and its opposite free end connected to a pin engaging end 186 of latch bar 182. The opposite or right end of latch bar 182 has a hooked portion 188 formed thereon that is in engagement with a pin 190 on a crank 192 that is fixedly attached to and rotates with the loading door 44.

With door 44 in the closed position of FIG. 3, spring 185 is in its normal low stress state and holds the latch bar 182 in its left most latching position wherein the pin 184 is captured in an open ended latching slot or channel 193 thereby holding housing section 20 in the compact operative position against the rearwardly directed biasing force of springs 176.

The loading door 44 is pivotally connected or hinged on the right side of housing section 18 and pivots about a pivot pin 194. In response to opening the door 44, by pivoting it in a clockwise direction about pin 194, the crank 192 rotates in a clockwise direction thereby moving pin 190 thereon to the right. This movement of pin 190 pushes the latch bar 182 to the right, and when pin 184 is clear of the open left end of the pin capturing slot 193, housing section 20 becomes unlatched and "pops out" to the extended position.

To relatch housing section 20, door 44 is closed, moving pin 190 back to the left. The biasing spring 185 pulls the latch bar 182 back to its latching position of FIG. 3. As housing section 20 is pushed in, pin 184 engages in angled cam surface 196 upon latch bar 182 and causes the latch bar to deflect to the right until the pin 184 is aligned with slot 193, whereupon the biasing force of spring 185 pulls the latch bar 182 to the left to, once again, latch housing 20 in its compact operative position.

In the illustrated embodiment, the pressure pad assembly 62 is adapted to be releasably connected to the transducer assembly 58, when housing section 20 is in the compact operative position, for movement therewith radially with respect to the disk 148 during information write and/or read operations.

As best shown in FIGS. 3 and 4, a disengageable pressure pad.connecting link 200 is attached to the transducer support 52. It extends to the left over plate 164 and terminates in an inturned forwardly extending tab 202 having a vertically disposed connecting pin 204 fixedly secured to its forward end.

The pressure pad assembly 62 comprises an elongated pad support member 206 having a pressure pad 208 mounted on the underside of a rearwardly projecting pad mounting dimple to 210 thereon. Support member 206 is connected to support member 52, for reciprocal sliding motion relative thereto, by means of a slider 212, attached to the right end of suppport 206, which is captured in a horizontal slide track or slot 214 in member 52 by means of a washer 216 that is press fitted onto a forwardly extending pin 218 on slider 212.

The right end of support 206 has an inwardly turned and rearwardly extending tab 220 formed thereon which has an open-ended receiving slot 222 therein for receiving pin 204 on connecting link 200 to make the mechanical connection to the head assembly 52 when housing section 20 is at its operative position.

The pressure pad assembly 62 also includes a biasing spring 224, held in a receiving socket 226 on support member 52, for urging pad support member 206, and thereby the pad 208 thereon, rearwardly such that the pad 208 extends through a radially extend slot in the forward wall 108 of cartridge 14 and engages the forward side of disk 148 in alginment with the transducer 150 on the opposite side, as best shown in FIG. 3.

As the transducer assembly 58 is moved radially by the head positioning system 60, the pad 208 follows the transducer 150 via the mechanical link. As best shown in FIG. 4, the pin 204 easily disengages from the receiving slot 222 when housing section is unlatched and moves rearwardly to its extended position.

As noted earlier, the pressure pad 208 ,may be replaced with a second transducer 150 for double-sided recording. Alternatively, the movable pressure pad assembly 62 may be replaced with a fixed, non-movable pressure pad assembly 62 which includes a larger pad 208 that covers the entire radial path of travel of the transducer 150 and therefore does not have to move therewith.

As noted earlier, some of the design objectives for apparatus 10 were to make it compact so that it may be used in portable and hand held devices, to protect the disk and disk drive against contamination by dust, dirt, sand and the like; and to make disk insertion and withdrawal as easy and as intuitive as possible.

Apparatus 10 achieves compactness by employing first and second housing sections arranged in telescopig relation for movement between the compact operative position and the extended position. When housing section 20 is extended, it only temporarily increases the overall volume of the device in which apparatus 10 is incorporated for a short time during disk insertion and withdrawal operations.

By moving selected disk drive components apart in response to retracting housing section 20, the disk cartridge 14 may be edge loaded through the relatively narrow access opening 50 which minimizes the possibility of dust or dirt being blown into the interior of the drive 51. Preferably, the access opening 50 and loading door 44 are provided with an O ring sealing system 250 in a manner similar to the housing section 20 to insure a good seal against dust and dirt.

Assume for the moment that apparatus 10 does not have a disk cartridge 14 therein, and that loading door 44 is closed and housing section 20 is in its pushed in compact operative position.

To load a disk cartridge 14, the operator manually pivots door 44 to the open position of FIG. 4. This motion of door 44 causes the latch bar 182 to be moved to the unlatching position of FIG. 4 so that housing section 20 moves rearwardly to its extended position under the biasing force of the spring assemblies 160. Also, the spring 116 pushes on the disk cartridge receiving and supporting frame assembly 63 which moves rearwardly and pivots slightly with respect to support member 52 to align the entry opening 66 with the access opening 50 in side wall 34.

At this point the operator slidably inserts the cartridge 14 into frame 64 and pushes it all the way in until the trailing end wall 81 clears the stops 80. He then presses the trailing end of the cartridge forwardly to position end wall 81 in the path of the stops 80 thereby locating the cartridge 14 at its operative location in frame 64.

Next, the operator pivots the door 44 to the closed position which returns the latch bar 182 to its normal latching position of FIG. 3. Then, the operator pushes the extended housing section 20 forwardly to its operative position which causes the latch bar 182 to retract slightly and then engage the latching pin 184 thereby locating housing section 20 at its compact operative position.

In response to this forward motion of housing section 20 toward the compact position, the spindle head 140 engages the disk hub 146 and the transducer 150 enters the transducer access slot in the cartridge 14. The forwardly directed pressure applied to the disk hub 146 pushes on the cartridge 14 which in turn pushes on the frame 64 to move it back to its operative position of FIG. 3 against the bias of spring 116, which is preferably designed to apply a relatively light spring force on assembly 63. With the frame 64 at its operative or forwardmost position, the pressure pad 208 enters the pressure pad access slot on the opposite side of cartridge 14 and assumes its operative position in alignment with transducer 150 as shown in FIG. 3.

Apparatus 10 is now ready for read and/or write operations. In the illustrated embodiment, it is incorporated in electronic imaging camera 12 which provides image signals that are recorded or written on the disk 148. Camera 12 may be provided with an electronic viewfinder which also doubles as a preview screen so that previously recorded images on disk 148 may be read from disk 148 and displayed through the viewfinder. Thus camera 12 would be configured for both data recording and playback operations.

To unload a disk cartridge 14, the user merely pivots the access door 44 to its open position. This retracts the latch bar 182 and disengages it from pin 184 thereby allowing housing section 20 to move rearwardly to its extended position The operator then pushes down on the trailing end of the cassette or cartridge 14 to release the trailing end from stops 80 whereupon the ejector 65 advances the cartridge 14 to the right out of the support frame 64 and through the access opening 50 into the waiting hand of the operator who can conveniently grasp the trailing end of the cartridge and fully remove it from appartus 10.

As noted earlier, the compact apparatus 10 may be suitably modified for use with optical recording media and their like by changing the transducer 150 to the appropriate electro-optical type and providing for compatable electronic signal processing. Thus, apparatus 10 may be used in a variety of devices which utilize magnetic, optical or magneto-optical recording while still retaining the advantages of compact size, protection against dust and dirt; and easy disk insertion and withdrawal.

Although the latch assembly 162 is illustrated as having only one latch bar on top, it could be provided with both top and bottom bars.

Since certain other changes may be made in apparatus 10 without departing from the spirit and scope of the invention involved herein, it is intended that all matter contained in the above description or shown in the accompanying drawings be interpreted as illustrative and not in a limiting sense.

What is claimed is:

1. A compact apparatus for writing and/or reading information on a disk, said apparatus comprising:
   a housing including a first housing section having a first opening, a telescoping second housing section, and means for mounting said second housing section on said first housing section to move by sliding through said first opening between a compact operative position and an extended disk insertion and withdrawal position;
   means for defining a second opening in said first housing section serving as an access opening through which a disk is moved for insertion and withdrawal;
   a disk drive within said housing for writing and/or reading information on a disk inserted thereinto through said access opening, said disk drive including at least first and second components mounted, respectively, on said first and second housing sections for relative movement therewith between said compact position, wherein said first and second components are in operative relation with the disk for write and/or read operations, and said extended position wherein at least one of said first and second components is spaced further away from the disk, than when said first and second components are in said operative position, for facilitating disk insertion and withdrawal operations;
   means on said first housing section for applying a biasing force on said second housing section urging it toward said extended position;
   latching means for releasably latching said second housing section, said latching means being movable between a latching position wherein it retains said second housing section in said compact position against the urging of said applied biasing force, and an unlatching position wherein it releases said second housing section for movement to said extended position under the influence of said biasing force; and
   a door mounted on said housing for movement between a closed position blocking said access opening and an open position unblocking said access opening.

2. The apparatus of claim 1 wherein said latching means and door are connected such that said latching means moves from said latching position to said unlatching position in response to moving said door from said closed position to said open position.

3. The apparatus of claim 2 wherein said latching means moves from said unlatching position to said latching position in response to moving said door from said open position to said closed position.

4. A compact apparatus for writing and/or reading information on a disk, said apparatus comprising:
   a housing including a first housing section having a first opening, a telescoping second housing section, and means for mounting said second housing section on said first housing section to move by sliding through said first opening between a compact operative position and an extended disk insertion and withdrawal position;
   a disk drive within said housing for writing and/or reading information on a disk inserted thereinto through said access opening, said disk drive including at least first and second components mounted, respectively, on said first and second housing sections for relative movement therewith between said compact position, wherein said first and second components are in operative relation with the disk for write and/or read operations, and said extended position wherein at least one of said first and second components is spaced further away from the disk, than when said first and second components are in said operative position, for facilitating disk insertion and withdrawal operations;
   a door mounted on said first housing section for movement between a closed position blocking said access opening and an open position unblocking said access opening; and
   means for sealing a space between said access opening and said closed door against the entry of dirt and the like therethrough into said drive.

5. A compact apparatus for writing and/or reading information on a disk, said apparatus comprising:
   a housing including a first housing section having a first opening, a telescoping second housing section, and means for mounting said second housing section on said first housing section to move by sliding through said first opening between a compact operative position and an extended disk insertion and withdrawal position;
   mesans for defining a second opening in said first housing section serving as an access opening through which a disk is moved for insertion and withdrawal; and
   a disk drive within said housing for writing and/or reading information on a disk inserted thereinto through said access opening, said disk drive including at least first and second components mounted, respectively, on said first and second housing sections for relative movement therewith between said compact position, wherein said first and second components are in operative relation with the disk for write and/or read operations, and said extended position wherein at least one of said first and second components is spaced further away from the disk, than when said first and second components are in said operative position, for facilitating disk insertion and withdrawal operations, and wherein said second disk drive component mounted on said second housing section includes a spindle assembly for spinning the disk, a transducer for writing and/or reading information on the disk, and means for moving said transducer radially with respect to the disk.

6. The apparatus of claim 5 wherin the disk is an optical disk and said transducer is of the optical type.

7. The apparatus of claim 5 wherein the disk is an optical disk and said transducer is of the optical type.

* * * * *